M. J. MYERS.
INSTRUMENT FOR LOCATING GROUNDS AND BREAKS IN ELECTRIC CIRCUITS.
APPLICATION FILED OCT. 13, 1902. RENEWED MAY 19, 1909.
944,459.
Patented Dec. 28, 1909.
4 SHEETS—SHEET 1.
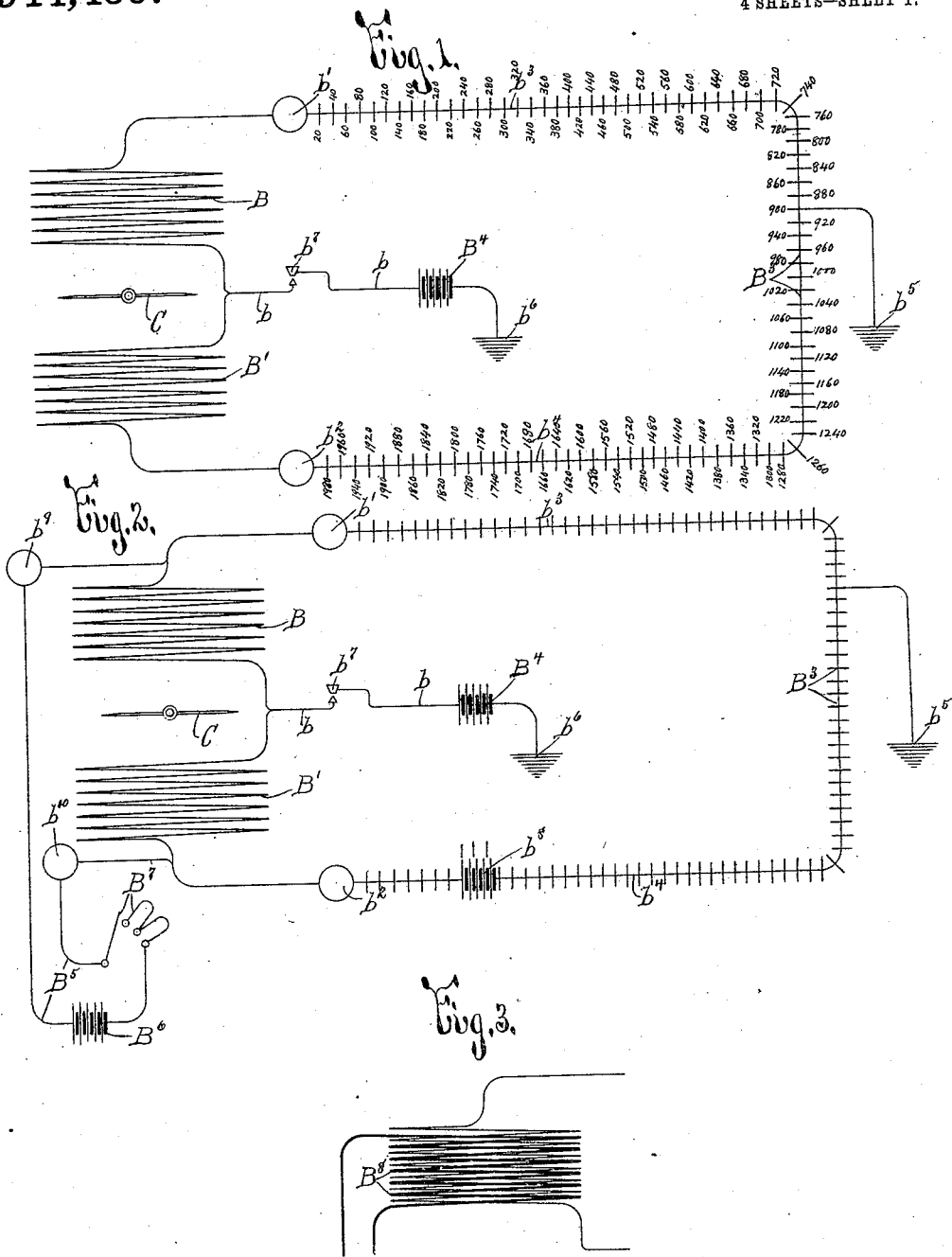
WITNESSES:
Chas. J. Toner.
Chas. Young.
INVENTOR
Matthew Jervis Myers
BY
Hey Parsons.
ATTORNEYS M. J. MYERS.
INSTRUMENT FOR LOCATING GROUNDS AND BREAKS IN ELECTRIC CIRCUITS.
APPLICATION FILED OCT. 13, 1902. RENEWED MAY 19, 1909.
944,459.
Patented Dec. 28, 1909.
4 SHEETS—SHEET 2.
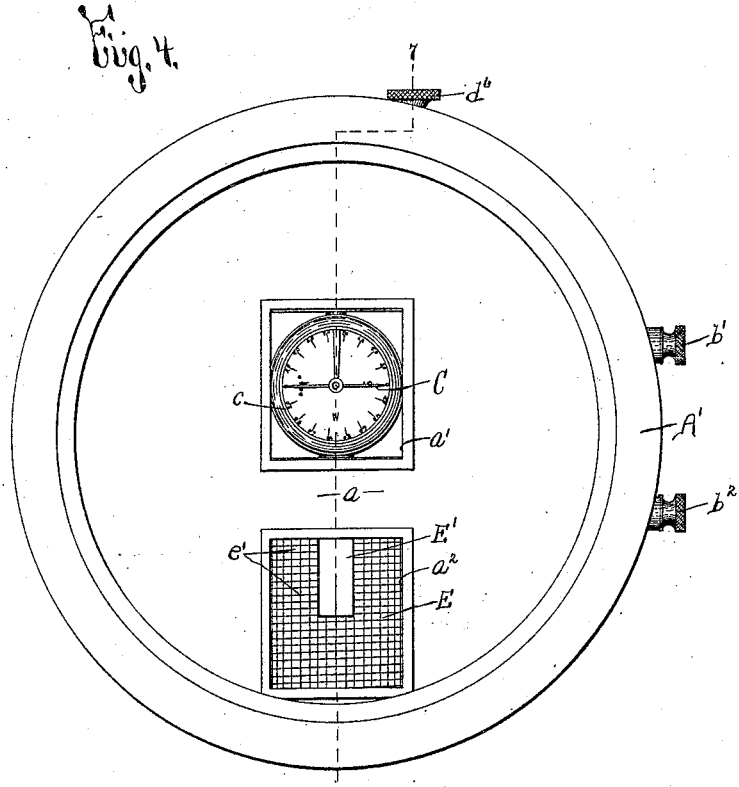
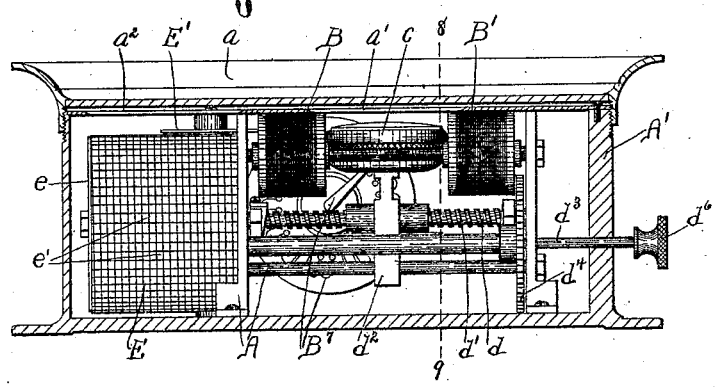

M. J. MYERS.
INSTRUMENT FOR LOCATING GROUNDS AND BREAKS IN ELECTRIC CIRCUITS.
APPLICATION FILED OCT. 13, 1902. RENEWED MAY 19, 1909.
944,459.
Patented Dec. 28, 1909.
4 SHEETS—SHEET 3.
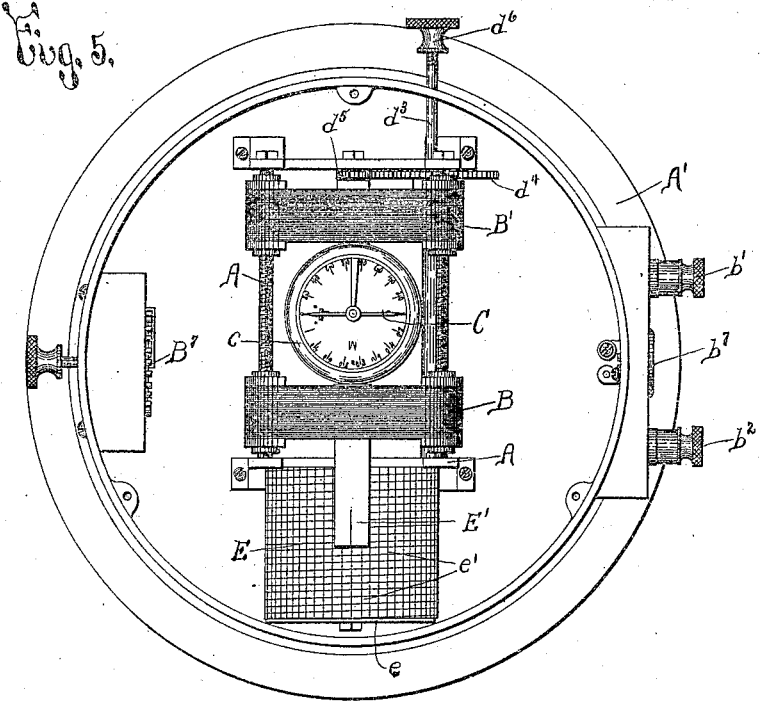
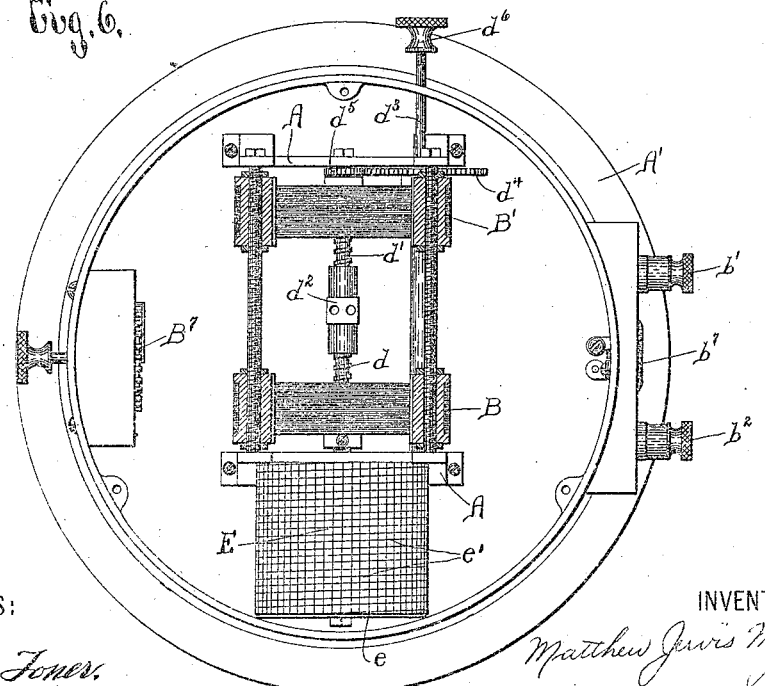
WITNESSES:
Chas. J. Foner.
Chas. Young.
INVENTOR
Matthew Jarvis Myers
BY
Hey Parsons
ATTORNEYS M. J. MYERS.
INSTRUMENT FOR LOCATING GROUNDS AND BREAKS IN ELECTRIC CIRCUITS.
APPLICATION FILED OCT. 13, 1902. RENEWED MAY 19, 1909.
944,459.
Patented Dec. 28, 1909.
4 SHEETS—SHEET 4.
Fig. 11.
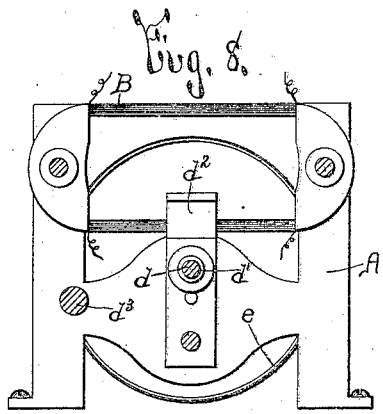
Fig. 8.
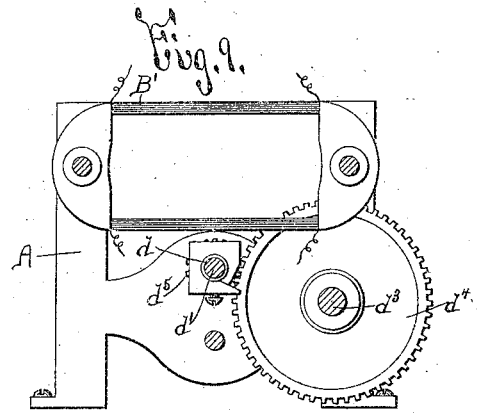
Fig. 9.
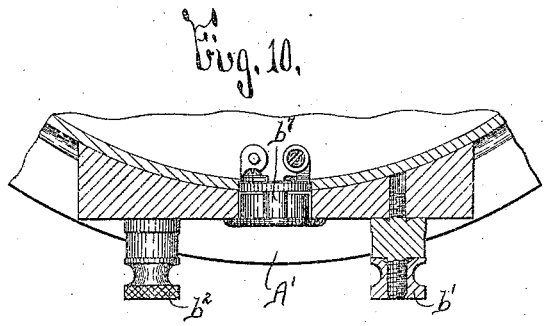
Fig. 10.
WITNESSES:
Chas. J. Toner.
Chas. Young.
INVENTOR
Matthew Jervis Myers
BY
Hoyt Parsons.
ATTORNEYS

UNITED STATES PATENT OFFICE.

MATTHEW JERVIS MYERS, OF SYRACUSE, NEW YORK.

INSTRUMENT FOR LOCATING GROUNDS AND BREAKS IN ELECTRIC CIRCUITS.

944,459.   Specification of Letters Patent.   Patented Dec. 28, 1909.

Application filed October 13, 1902, Serial No. 127,021. Renewed May 19, 1909. Serial No. 496,933.

*To all whom it may concern:*

Be it known that I, MATTHEW JERVIS MYERS, of Syracuse, in the county of Onondaga and State of New York, have invented a certain new and useful Instrument for Locating Grounds and Breaks in Electric Circuits, of which the following is a specification.

This invention has for its object the production of an instrument for measuring electrical resistances, and for testing circuits and locating unknown grounds and breaks therein. To this end, it consists in the novel combinations and constructions hereinafter set forth and claimed.

In describing this invention, reference is had to the accompanying drawings, forming part of this specification, in which like letters refer to corresponding parts in all the views.

Figure 1 is a diagrammatic view showing an electric circuit and my instrument operatively connected therewith when no line-battery is used in the circuit. Fig. 2 is a diagrammatic view, illustrating the instrument connected to an electric circuit having a line-battery therein and means for neutralizing said battery. Fig. 3 is a diagrammatic view showing a modification of the windings of the magnetizing members when a line-battery is used. Fig. 4 is a face view of my instrument. Fig. 5 is a face view thereof with the cover of the case removed. Fig. 6 is a view similar to Fig. 5 with the magnetizing members in section and the magnetizable member removed. Fig. 7 is a sectional view of my instrument taken on line 7—7, Fig. 4. Figs. 8 and 9 are sectional views taken on line 8—9, Fig. 9, looking in opposite directions. Fig. 10 is a detail sectional view of a portion of the case showing the push-button for connecting my instrument in circuit to make a test. Fig. 11 is a detail view of the indicating surface.

This invention comprises a frame A, oppositely-acting magnetizing members B B′, a magnetizable member C normally in a state of equilibrium which is upset by differential influence of the magnetizing members, means for restoring the equilibrium of said magnetizable member, and indicating means.

The frame A is of any desirable form, size and construction, and is usually inclosed within a suitable case A′ having a removable cover $a$ provided with transparent portions $a'$ $a^2$.

The magnetizing members B B′ are here illustrated as consisting of oppositely-wound conductors arranged end to end upon the frame A, and having their adjacent ends separated and connected by an electric conductor $b$, preferably in multiple circuit, and their opposite ends connected respectively to the terminals or binding posts $b'$ $b^2$ which are in circuit with the opposite branches $b^3$ $b^4$ of an electric circuit $B^3$, having an unknown ground or break, as the ground $b^5$. Said magnetizing members during the use of the instrument in testing a grounded or broken circuit are thus connected respectively to two electric circuits, including respectively the branches $b^3$ $b^4$, as will be apparent to those skilled in the art. The electric conductor $b$ is in circuit with a source of electric energy $B^4$ grounded at $b^6$, and is electrically connected with and disconnected from the magnetizing members B B′ by the contact-point or push-button $b^7$ which is disposed in the wall of the case A′. The circuit $B^3$ is marked off into subdivisions and the locating of the subdivision having an unknown ground is dependent on the electrical resistance in the branches $b^3$ $b^4$ of the circuit, these resistances being in proportion to the respective distances along the branches $b^3$ $b^4$ from said ground to the source of electric energy.

The magnetizable member C is inclosed in any desirable case $c$ and is subject to the differential influence of the magnetizing members B B′. Said magnetizable member C indicates the presence of a current in the circuit to be tested, is normally in a state of equilibrium as when there is no ground or break in the circuit, and hence, no current, and moves automatically to its normal position as the influence of the members B B′ thereon is equalized. In case the resistances of the opposite branches of the circuit $B^3$ are unequal, as when the circuit to be tested is grounded at one side of the central point thereof, the magnetizable member C is deflected toward the stronger of the members B B′, which is the one of said members B B′ connected to the branch offering the least resistance to the current because of its shorter length. A magnetic needle is preferably used as the magnetizable member C, but any other suitable means capable of automatically assuming a normal position when relieved from the differential influence of the members B B′ may be employed for indicating the presence of a current.

As illustrated, the magnetizable member C is arranged between the adjacent ends of the magnetizing members B B′, and one of said members C B B′ is movable relatively to the others for restoring the equilibrium of the member C, after the same has been upset by the differential influence of the members B B′. Preferably, the magnetizable member C is movable relatively to the members B B′, but it is obvious that said member C may be fixed and one or both of the members B B′ movable relatively thereto.

As seen in Fig. 2, the circuit to be tested may be provided with a line-battery or source of electric energy $b^8$, in which case, before the test is made, the effect of the battery $b^8$ on the magnetizing members B B′ is neutralized by a local circuit $B^5$, here shown as provided with a source of electric energy $B^6$, and a device, as a rheostat $B^7$, for regulating the intensity of the local neutralizing current. The opposite poles of the local circuit $B^5$ are connected to terminals or binding posts $b^9$ $b^{10}$ respectively in circuit with the opposite ends of the magnetizing members B B′. The function of the rheostat $B^7$ may be performed by independently wound neutralizing coils $B^8$ which are energized by the battery $B^6$ and act respectively on the coils B′ $B^2$.

The means for restoring the equilibrium of the magnetizable member C after the same has been upset operates to regulate and equalize the differential influence of the magnetizing members B B′ on the member C and consists of a movable part, as a rotatable shaft $d$ journaled in the frame A and having a worm $d'$, and a carriage or support $d^2$ for the member C movable along the shaft $d$ by the worm $d'$ when the shaft $d$ is rotated, said carriage $d^2$ having a threaded opening for receiving the worm $d'$. The shaft $d$ is actuated by a second shaft $d^3$ which is journaled in the frame A, is connected to said shaft $d$ by power-transmitting members $d^4$ $d^5$, and is extended through the case A′ and provided with a hand-piece $d^6$ on its outer end.

The indicating means comprises an indicating surface E and an indicator E′, the surface E being movable laterally beyond the indicator and said indicator being movable lengthwise relatively to the surface E. As illustrated, the surface E is provided on a cylindrical support $e$ mounted on and revoluble with the shaft $d$ and is divided into subdivisions by graduations $e'$ corresponding to the subdivisions of the circuit to be tested. When the indicating surface is in position its graduations progress spirally. The indicator E′ has a movement corresponding to that of the movable part $d$ and the member C, and is here shown as connected to said part, being fixed to the case $c$ for the magnetizable member C. As will be obvious to those skilled in the art, the indicating means is controlled by the variation of the relative position of the magnetizing and magnetizable members and in the operation of this instrument in locating a ground, said means indicates the proportional resistance of the circuits connected to the magnetizing members.

In use, my instrument is connected in the circuit to be tested, and the contact-point or push-button $b^7$ is actuated. If the circuit being tested is unbroken and does not contain a ground, the member C is unaffected and remains in its normal position. On the contrary, if the line is grounded at one side of its central point, as at $b^5$, separate circuits respectively including the opposite branches $b^3$ $b^4$ are completed through the ground $b^6$, thus differentially energizing the magnetizing members B B′ and causing the member C to be deflected toward the stronger of said members B B′. The hand-piece $d^6$ is then actuated and causes the part $d$ to move the magnetizable member C relatively to the members B B′ until the member C reaches a position where the influence thereon of the members B B′ is substantially equal, and during the movement of the part $d$ said member C automatically moves relatively to the members B B′ to its normal position of equilibrium. During the movement of the member C by the part $d$, the indicating surface E and the indicator E′ are adjusted relatively to each other in conformity with the movement of the member C so that the indicator registers with the subdivision of the indicating surface corresponding to the grounded subdivision of the circuit to be tested.

When the circuit is grounded it will be understood that the strength of the magnetizing members is dependent upon the resistance in the legs of the grounded circuit in which said members are respectively connected and that therefore the magnetizing member connected to the longer leg of the grounded circuit will be of less strength than the magnetizing member connected in the shorter; but when the circuit is broken I have found that when the instrument is connected in a circuit through which a constant current is passing, the instrument is operated by leakage from the legs of the broken circuit to the earth, or to the ground wire when the instrument is in an all-metallic circuit, and that when the instrument is connected in a circuit through which an intermittent or alternating current is passing, a condenser action takes place between the legs of the broken circuit and the earth or ground wire. Therefore the magnetizing member connected to the longer leg of the broken circuit will be of greater strength than that connected to the shorter. Consequently if said circuit instead of being grounded is broken, the instrument is manipulated in like manner as described for determining the position of an unknown ground, but to those skilled in the art, it will be understood that the magnetizing member connected to the longer branch will have a greater influence on the member C than the other magnetizing member, and that the subdivision containing the break will be found on the branch of the circuit opposite to that containing the subdivision which would be indicated by the instrument, providing the circuit were grounded instead of broken.

Although I have described my instrument as applied for testing circuits, I do not limit it to such use, since said instrument may obviously be used as a meter, the operation of which is dependent on electrical resistances.

The construction and operation of this instrument will now be readily understood upon reference to the foregoing description and the accompanying drawings, and it will be particularly noted that more or less change may be made in the construction and arrangement of its component parts without departing from the spirit of my invention.

Having thus fully described my invention, what I claim as new and desire to secure by Letters Patent, is:—

1. In an instrument for locating an unknown portion of a circuit to be tested, the combination of oppositely-acting magnetizing members adapted to be connected respectively to the branches of the circuit, a magnetizable member subject to the differential influence of the magnetizing members, said magnetizable member being movable automatically relatively to the magnetizing members, means for varying the relative position of the magnetizing and magnetizable members, and means controlled by the variation of the relative position of the magnetizing and magnetizable members for indicating the position of the unknown portion of the circuit, substantially as and for the purpose set forth.

2. The combination of a pluraltiy of oppositely-acting magnetizing members adapted to be connected respectively in electric circuits, a support, a magnetizable member carried by the support and subject to the differential influence of the magnetizing members, said magnetizable member being movable automatically relatively to the support, means for moving the support relatively to the magnetizing members, and an indicating means carried by and movable with the support, substantially as and for the purpose specified.

3. The combination of a plurality of oppositely-acting magnetizing members adapted to be connected respectively in electric circuits, a magnetizable member subject to the differential influence of the magnetizing members, and means for varying the relative position of the magnetizing and magnetizable members; with indicating means comprising an indicating surface and an indicator each movable relatively to the other, substantially as and for the purpose specified.

4. The combination of a plurality of oppositely-acting magnetizing members adapted to be connected respectively in electric circuits, a magnetizable member subject to the differential influence of the magnetizing members, said magnetizable member being movable automatically relatively to the magnetizing members, and means for varying the relative position of the magnetizing and magnetizable members; with indicating means comprising an indicating surface and an indicator each movable relatively to the other and controlled by the variation of the relative position of the magnetizing and magnetizable members, substantially as and for the purpose set forth.

5. The combination of a plurality of oppositely-acting magnetizing members connected respectively in electric circuits, a magnetizable member subject to the differential influence of the magnetizing members, means for moving one of said members relatively to the others for neutralizing the differential influence of said magnetizing members on the magnetizable member, an indicating surface, an indicator connected to said relatively-movable member and movable therewith relatively to the indicating surface, and means for simultaneously moving the indicating surface relatively to the indicator, substantially as and for the purpose described.

6. The combination of a plurality of oppositely-acting magnetizing members connected respectively in electric circuits, a magnetizable member subject to the differential influence of the magnetizing members, means for moving one of said members relatively to the others for neutralizing the differential influence of said magnetizing members on the magnetizable member, an indicating surface, an indicator having movement corresponding to the movement of said relatively-movable member, and means for moving the indicating surface relatively to the indicator and the indicator relatively to said indicating surface at the same time, substantially as and for the purpose specified.

7. An instrument for locating grounds and breaks in electric circuits comprising a frame, a plurality of oppositely-acting magnetizing members, a magnetizable member subject to the differential influence of the magnetizing members, one of said members being movable relatively to the others for neutralizing the differential influence of said magnetizing members on the magnetizable member, an indicating surface, an indicator movable along the indicating surface and having movement corresponding to the movement of said relatively-movable member, an actuating shaft journaled in the frame, and a carriage for said relatively-movable member movable along the shaft when said shaft is rotated, substantially as and for the purpose set forth.

8. The combination of a plurality of oppositely-acting magnetizing members adapted to be connected respectively in electric circuits, a magnetizable member subject to the differential influence of the magnetizing members, and means for varying the relative position of the magnetizing and magnetizable members; with indicating means comprising a rotatable cylindrical support provided with an indicating surface, substantially as and for the purpose described.

9. An instrument for locating grounds and breaks in electric circuits comprising a frame, a plurality of oppositely-acting magnetizing members, a magnetizable member subject to the differential influence of the magnetizing members, one of said members being movable relatively to the others for neutralizing the differential influence of said magnetizing members on the magnetizable member, an indicating surface, an indicator movable along said indicating surface and having movement corresponding to the movement of said relatively-movable member, and a rotatable cylindrical support for the indicating surface, substantially as and for the purpose described.

10. The combination of a plurality of oppositely-acting magnetizing members connected respectively in electric circuits, an electric conductor connecting the magnetizing member in multiple circuit, a magnetizable member subject to the differential influence of the magnetizing members, said magnetizing member being normally in a state of equilibrium, the equilibrium of said magnetizable member being upset by the differential influence of said magnetizing members, means for restoring the equilibrium of said magnetizable member, an indicating surface having subdivisions corresponding to subdivisions of said circuits, and an indicator coöperating with said surface, substantially as and for the purpose specified.

11. The combination of an electric circuit, oppositely-acting magnetizing members having corresponding ends connected to opposite branches of the circuit and their other ends connected in multiple circuit, said magnetizing members being energized differentially when the circuit is grounded or broken thereby forming two circuits, a magnetizable member subject to the differential influence of said magnetizing members, and movable automatically to its normal position, and means coöperating with the magnetizable member for locating the position of the ground or break in said circuit, substantially as and for the purpose set forth.

In testimony whereof, I have hereunto signed my name in the presence of two attesting witnesses at Syracuse, in the county of Onondaga, in the State of New York, this 10th day of October, 1902.

MATTHEW JERVIS MYERS.

Witnesses:
D. LAVINE,
F. G. BODELL.